US 6,627,319 B2

(12) United States Patent
Jacquiod et al.

(10) Patent No.: US 6,627,319 B2
(45) Date of Patent: Sep. 30, 2003

(54) GLAZING WITH A FUNCTIONAL, ESPECIALLY HYDROPHOBIC, MESOPOROUS COATING

(75) Inventors: Catherine Jacquiod, Gif sur Yvette (FR); Jean-Marc Berquier, Deuil la Barre (FR); Laurent Teyssedre, Paris (FR); Marie-José Azzopardi, Vincennes (FR)

(73) Assignee: Saint-Gobain Glass France, Courbevoie (FR)

( * ) Notice: Subject to any disclaimer, the term of this patent is extended or adjusted under 35 U.S.C. 154(b) by 0 days.

(21) Appl. No.: 09/884,936

(22) Filed: Jun. 21, 2001

(65) Prior Publication Data

US 2002/0034627 A1 Mar. 21, 2002

Related U.S. Application Data

(63) Continuation of application No. PCT/FR99/03167, filed on Dec. 16, 1999.

(30) Foreign Application Priority Data

Dec. 21, 1998 (FR) .............................. 98 16115

(51) Int. Cl.[7] .............................. B32B 9/04; B32B 3/26; B32B 17/06
(52) U.S. Cl. ................ 428/448; 428/304.4; 428/312.2; 428/315.7; 428/428; 428/429; 428/446; 428/447; 428/688; 428/696; 428/702
(58) Field of Search ................. 428/428, 429, 428/446, 447, 304.4, 312.2, 313.7, 448, 688, 696, 702

(56) References Cited

U.S. PATENT DOCUMENTS

| 5,112,676 | A | 5/1992 | Cot et al. ................... 427/226 |
| 5,443,862 | A | 8/1995 | Buffat et al. ................. 427/526 |
| 5,645,891 | A | 7/1997 | Liu et al. ................... 427/376.2 |
| 5,997,943 | A | 12/1999 | Azzopardi et al. ........... 427/167 |
| 6,326,326 | B1 * | 12/2001 | Feng et al. .................... 502/62 |
| 6,329,017 | B1 * | 12/2001 | Liu et al. ..................... 427/240 |
| 6,380,266 | B1 * | 4/2002 | Katz et al. ................... 516/101 |

FOREIGN PATENT DOCUMENTS

| EP | 0 484 746 A2 | 5/1992 |
| EP | 0 492 417 A2 | 7/1992 |
| EP | 0 492 545 A2 | 7/1992 |
| EP | 0 497 189 A2 | 8/1992 |
| EP | 0 672 779 A2 | 9/1995 |
| EP | 0 719 743 A1 | 7/1996 |
| EP | 0 799 873 A1 | 10/1997 |
| FR | 2 695 117 | 3/1994 |

OTHER PUBLICATIONS

Feng, X. et al., "Functionalized Monolayers on Ordered Mesoporous Supports," *Science*, vol. 276, no. 5314 (May 9, 1997), pp. 923–926.

Gojon, C. et al., "A comparison of immobilization sol–gel methods for an optical chemical hydrazine sensor," *Sensors and Actuators B*, vol. 38–39, No. 1–3, (Jan. 1, 1997), pp. 154–162.

\* cited by examiner

*Primary Examiner*—Robert Dawson
*Assistant Examiner*—Michael J. Feely
(74) *Attorney, Agent, or Firm*—Pennie & Edmonds LLP

(57) ABSTRACT

The substrate of the invention is coated with a mesoporous film. It is characterized in that chemical molecules, especially hydrophobic/oleophobic molecules, are bonded to the mesoporous film. The invention also relates to a process for manufacturing this substrate, in which: the substrate is brought into contact with a composition formed from organic assembling groups and from a precursor for the mesoporous material; the precursor precipitates around the assembling groups and polymerizes; and the assembling groups are removed. This process is distinguished by the fact that chemical molecules, such as hydrophobic/oleophobic molecules, are then brought into contact with the mesoporous film. The invention also relates to glazing, for buildings or transportation vehicles, which includes this substrate.

25 Claims, No Drawings

GLAZING WITH A FUNCTIONAL, ESPECIALLY HYDROPHOBIC, MESOPOROUS COATING

CROSS-REFERENCE TO RELATED APPLICATIONS

This application is a continuation of the U.S. National Stage designation of International Patent Application PCT/FR99/03167, filed Dec. 16, 1999, which claims priority to French Patent Application No. 98/16115, filed Dec. 21, 1998, the entire contents of which are expressly incorporated herein by reference thereto.

FIELD OF THE INVENTION

The present invention relates to a substrate, especially a transparent substrate, endowed with a property of hydrophobicity/oleophobicity for the purpose of obtaining certain anti-rain/anti-fouling effects or else the property of hydrophilicity/oleophilicity, or a photocatalytic characteristic, this being associated, respectively, with anti-misting/anti-frosting and also anti-staining effects, or with other properties: fragrance, etc. For this purpose, such a substrate, for example, is provided with a coating within the context of various applications, such as glazings for aeronautical, sea-going, land-borne (rail and road) transport vehicles, for building (windows), for urban furniture (display panels, bus shelters, etc.) or interior design (decorative panels, furnishings), domestic electrical appliances (refrigerator and oven doors, showcases, glass-ceramic plates), kitchen utensils, sanitaryware (washbasins, bathtubs, etc.), construction materials, etc.

BACKGROUND OF THE INVENTION

The substrate is therefore transparent or non-transparent and consists, in general, of glass, ceramic, glass-ceramic, metal, plastic (polymethyl methacrylate (PMMA), polyvinyl butyral (PVB), polycarbonate (PC) or polyurethane (PU), thermoplastic ethylene/vinyl acetate copolymer (EVA), polyethylene terephthalate (PET), polybutylene terephthalate (PBT), polycarbonate/polyester copolymers, cycloolefin copolymers of the ethylene/norbornene or ethylene/cyclopentadiene type, ionomer resins, for example an ethylen/(meth)acrylic acid copolymer neutralized by a polyamine, thermosetting or thermally crosslinkable polymers such as polyurethane, unsaturated polyester (UPE), ethylene/vinyl acetate copolymer, etc.) or of a combination of several of these materials.

The hydrophobicity/oleophobicity property to which reference has been made means that polar or nonpolar liquids do not adhere to the substrate so as to form an annoying film. A substrate having this property will have little or almost no tendency to retain dust or dirt of any type, fingermarks, insects, etc.

The presence of water and/or dirt results in an unattractive appearance and, as the case may be, a reduction in the transparency of the substrate together with an impairment of vision through it. Water and dirt are particularly annoying when the substrate is used for glazing in the transportation field.

The property of hydrophobicity/oleophobicity, or non-wettability, of a substrate means that the contact angles between a liquid and this substrate are high, for example, at least 90° in the case of water. The liquid therefore tends to flow off easily, in the form of drops, on the substrate simply under gravity if the substrate is inclined or due to the effect of aerodynamic forces in the case of a moving vehicle. Such known agents for imparting this hydrophobicity/oleophobicity property are, for example, fluoroalkylsilane such as those described in Patent Applications EP 0 492 417, EP 0 492 545 and EP 0 672 779.

Common hydrophobic/oleophobic agents are, in particular, alkyltrihalosilanes or alkyltrialkoxy-silanes, the alkyl group of which has at least one perfluorinated end group, that is to say one consisting of an $F_3C—(CF_2)_n—$ group in which n is a positive integer or zero, as described in Patent Application EP 0 719 743.

The hydrophobic/oleophobic agents are applied in a known manner as a solution using conventional deposition methods with or without heating.

One of the problems arising most acutely in the field of the invention is that of the durability of the hydrophobic/oleophobic coating. This is because durability is affected by the erosion which inevitably happens to some extent, for example during the periodically essential operations of cleaning the substrate when the latter is transparent, in order to restore satisfactory vision through the substrate. Thus, it is constantly endeavoured to slow down the rate of progressive removal of the hydrophobic/oleophobic coatings of the aforementioned types which takes place especially owing to the action of windscreen wipers, the more so as such removal may, in addition, result in degradation by ultraviolet radiation.

Two main approaches have hitherto been explored for increasing the durability of the coatings by limiting the erosion effects. Both these approaches consist in increasing the adhesion of the coatings to the substrates.

According to a first approach, Application EP 0 484 746 recommends the preparation of the substrate by a pre-treatment using a primer of the tetrahalosilane or tetralkoxysilane type.

Application EP 0 497 189 A2 proposes, according to a second approach, the prior creation on the surface of the substrate of irregularities having sizes, for example, of between 1 and 10 micrometers, either by adding particles or by various etching techniques such as chemical etching or sandblasting.

Moreover, it has been specified that, in all cases, there is no particular difficulty in reforming a new hydrophobic/oleophobic coating in order to remedy the erosion of the previous coating; this may be done on the old coating once it has been briefly cleaned. However, it is still obviously beneficial to delay this operation as long as possible.

SUMMARY OF THE INVENTION

The present invention is related to a substrate coated with a mesoporous film, wherein chemical molecules are bonded to the mesoporous film. In one embodiment, the substrate is made of a glass material or a plastic, and in another embodiment the substrate is made of glass. The mesoporous film may include at least one compound including at least one of the elements Si, W, Sb, Ti, Zr, Ta, V, Pb, Mg, Al, Mn, Co, Ni, Sn, Zn, In. The mesoporous film may have a periodic lattice on the scale of domains at least about 20 nm in size, and the mesoporous film may be electrically conducting. The chemical molecules may be hydrophobic/oleophobic and chosen from the group consisting of:

a) silicones; and
b) compounds satisfying the formulae:

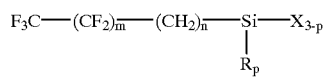
(I)

and $R_{p'}SiX_{4-p'}$ (II)

wherein m=0 to 15, n=1 to 5, p=0, 1 or 2, R is a linear or branched alkyl group or a hydrogen atom, X is a hydrolysable group such a halogen, alkoxy, acetoxy, acyloxy, amino or NCO group, and p'=0, 1, 2 or 3.

The present invention also is related to a process for manufacturing a substrate including: bringing the substrate into contact with a composition formed from organic assembling groups and from at least one precursor for the material constituting a mesoporous film; precipitating the precursor around the organic assembling groups and growing the molecules of the precursor; and then removing the organic assembling groups, wherein chemical molecules, such as hydrophobic/oleophobic molecules, are then brought into contact, in the form of a solution or of a gas containing them, with the mesoporous film. The composition has a pH, and prior to bringing the substrate into contact with the composition, a layer having an isoelectric potential greater than or equal to the pH of the composition may be deposited on the substrate. In some embodiments, the organic assembling groups are micelles of cationic surfactant molecules, the precursor is a silicon alkoxide, and the organic assembling groups and precursor are in solution and possibly in hydrolysed form. The cationic surfactant may be cetyltrimethylammonium bromide, the precursor may be in solution due to hydrolysis in an acid medium of $Si(OH)_4$, and the surfactant/Si molar ratio may be between $10^{-4}$ and 0.5.

The present invention further is related to a glazing for buildings or transportation vehicles that has a transparent surface, wherein at least a portion of the transparent surface includes a substrate coated with a mesoporous film and chemical molecules bonded thereto.

In addition, the present invention is related to a substrate including a coating surface and a mesoporous film having hydrophobic/oleophobic molecules bonded thereto, wherein the mesoporous film is disposed on said coating surface. The molecules include at least one of:

a) silicones; and
b) compounds satisfying the formulae

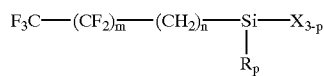
(I)

and $R_{p'}SiX_{4-p'}$ (II)

wherein m=0 to 15, n=1 to 5, p=0, 1 or 2, R is a linear or branched alkyl group or a hydrogen atom, X is a hydrolysable group such a halogen, alkoxy, acetoxy, acyloxy, amino or NCO group, and p'=0, 1, 2 or 3. In some embodiments the mesoporous film has pores sized between about 1.2 nm and about 40 nm, and in other embodiments the pores are sized between about 1.2 nm and about 20 nm. The mesoporous film may be a periodic lattice including domains of at least 20 nm, and the mesoporous film may be formed of at least one compound including at least one of Si, W, Sb, Ti, Zr, Ta, V, Pb, Mg, Al, Mn, Co, Ni, Sn, Zn, and In. The coating surface may be at least one of glass, ceramic, glass-ceramic, or polymer.

DETAILED DESCRIPTION OF PREFERRED EMBODIMENTS

The inventors have now employed a different technique, capable of increasing the durability of the hydrophobic/oleophobic coatings of the abovementioned types.

For this purpose the subject of the invention is a substrate coated with a mesoporous film characterized in that chemical molecules (especially hydrophobic/oleophobic molecules) are bonded to the mesoporous film.

Within the context of the invention, the term "mesoporous" refers to pores having a size of between 1.2 and 40 nm, in particular 1.2 and 20 nm. Specifically it has been found, not without surprise, that the grafting of hydrophobic/oleophobic molecules onto a messoporous layer guarantees that the hydrophobic/oleophobic function is remarkably persistent over time, even under severe erosion conditions. The excellent performance explained below is assumed to result from the combination of at least four characteristics:

1) good adhesion of the mesoporous coating to the substrate;
2) good adhesion, promoted by mechanical anchoring, of the hydrophobic/oleophobic molecules to the mesoporous coating;
3) good abrasion resistance of the mesoporous coating; and
4) release and activation, staggered over time, of the hydrophobic/oleophobic molecules.

The substrate may be—but is not necessarily—transparent and has, in this case, excellent optical properties allowing it to meet the standards applicable to use in glazing.

Chemical molecules other than hydrophobic/oleophobic molecules may also be bonded to the mesoporous film so as to form coatings of excellent durability.

These are, in particular, hydrophilic/oleophilic molecules from which mention may be made, as final product or as precursor, of (meth)acrylic polyacids as they are or at least partially salified by sodium, potassium, caesium, etc., nonionic surfactants, cellulose esters, such as hydroxypropylcellulose, chitosan and chitin derivatives, polymethacrylates, polyvinyl alcohols and polyvinyl acetate, polypyrrole, polyaniline, polyacrylamide, poly(N, N-dimethylacrylamide), poly(N-isopropylacrylamide), polyethylene glycol, polypropylene glycol, polyoxyethylene having hydroxy or methoxy terminal functional groups, polyallylamine hydrochloride, polysaccharides, (branched) dextrans, pollulan (linear polysaccharide), poly(styrenecarboxylic acid) and salts thereof, poly(stryrenesulphonic acid), sodium polystyrene sulphonate, polyvinyl butyral, poly(2-vinyl-N-methyl pyridinium iodide), poly(4-vinyl-N-methyl pyridinium iodide), poly(2-vinylpyridine), poly(2-vinyl-pyridinium bromide), polyvinyl pyrrolidone, copolymers obtained from initial monomers of the various aforementioned polymers, and especially block copolymers, certain titanium compounds, such as tetraisopropyl or tetraisobutyl titanium compounds, possibly stabilized, for example by acetyl acetonate, titanium tetrachloride, etc.

It is also possible to bond to the mesoporous film antibacterial molecules, anti-fungal molecules, or molecules of conventional fragrances, etc.

The process of bonding them to the mesoporous film comprises, depending on the case in situ polymerization and/or impregnation.

The substrate preferably consists of a glass material or a plastic of the aforementioned type. It may consist of a single sheet or a laminate formed from several sheets joined together, or else it may be a solid object whose surface intended to receive the mesoporous coating is smooth and, in general, but not necessarily, flat.

The glass material in which the substrate can be formed is a glass, a ceramic or a glass-ceramic. It is preferred to employ glass, especially float glass of conventional composition, possibly hardened or toughened, an aluminium borosilicate and a sodium borosilicate or any other composition. In this case, the invention in no way excludes placing, between the film and the mesoporous film, or on that side of the glass sheet opposite the one bearing the mesoporous film, customary functional layers for glazing, namely anti-reflection multilayers or, on the contrary, reflecting layers, electrically conducting layers, decorative layers, or layers having thermal properties such as low emissivity, etc.

Many chemical elements may be at the basis of the mesoporous film. It comprises, as essential constituent material, at least one compound of at least one of the elements: Si, W, Sb, Ti, Zr, Ta, V, Pb, Mg, Al, Mn, Co, Ni, Sn, Zn.

With reference to the above description of the chemical molecules which, in accordance with the invention, may be bonded to the mesoporous film and which comprise certain titanium compounds as hydrophilic/oleophilic molecules, it should be noted that when the mesoporous film itself is based on titanium, especially in the form of the dioxide $TiO_2$, it also exhibits hydrophilic/oleophilic (anti-misting/antifrosting) properties together with the ability to decompose organic residues (anti-staining property) photocatalytically, and this being in the absence of bonding with chemical molecules. However, the bonding to this type of mesoporous film of certain titanium compounds is capable of increasing to a greater or lesser extent durability of the abovementioned corresponding functions.

According to an advantageous characteristic, the mesoporous film has a periodic lattice on the scale of domains of at least 20 μm. In other words, the mesoporous film comprises a multitude of identical geometrical features which are characterized by a dimension of at least 20 nm, but are oriented randomly. This characteristic dimension corresponds to a dimension of coherent diffraction domains and can be deduced, in a known manner from the Scherrer formula for the width of the main peak—indexed 100—of the X-ray diffraction diagram. The advantage of the periodicity on a relatively large scale of the mesoporous lattice is that it is possible to orient the porous domains—corresponding to the abovementioned individual features—in an ordered manner, for example all perpendicular to the substrate or all parallel to the substrate, for the purpose, especially in the latter case, of obtaining electrically conducting coatings.

According to one particularly advantageous embodiment of the invention, the mesoporous film is electrically conducting. It then consists, for example, of substoechiometric and/or doped metal oxides as described in Application FR 2 695 117.

Examples mentioned in that application are tin-doped indium oxide (ITO), indium-doped zinc oxide (In:ZnO) fluorine-doped zinc oxide (F:ZnO), aluminum-doped zinc oxide (Al:ZnO) or tin-doped zinc oxide (Sn:ZnO) and fluorine-doped tin oxide (F:SnO$_2$). In addition to their electrical conduction properties, these materials are described as having reflection properties in the infrared, especially low-emissivity properties. However, the capability of the mesoporous film to conduct electricity is, within the context of the present invention, aimed mainly at providing the antistatic function, that is to say the ability to dissipate electrostatic charges and to prevent them from building up locally and, to a lesser extent, the construction of heating films, especially for defrosting and demisting windows. Another electrically conducting material that can be used is antimony-doped tin oxide Sb:SnO$_2$ (the antimony being pentavalent or trivalent).

The thickness of the mesoporous film on the substrate of the invention is advantageously between 10 nm and 10 μm, and in particular between 0.05 and 5 μm.

The hydrophobic/oleophobic molecules are preferably chosen from the group consisting of:

a) silicones and b) compounds satisfying the formulae:

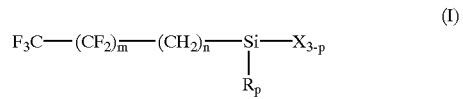

(I)

(II)

in which:

m=0 to 15;

n=1 to 5;

p'=0, 1 or 2;

R is a linear or branched alkyl group or a hydrogen atom;

X is a hydrolysable group such as a halogen, alkoxy, acetoxy, acyloxy, amino or NCO group;

p'=0, 1, 2 or 3.

A standard compound satisfying formula (II) is octadecyltrichlorosilane.

As silicones, mention may be made of polydialkylsiloxanes. Compounds satisfying formula (I) have already been described elsewhere, for example in Application EP 0 799 873 A1.

Moreover, the subject of the invention is also a process for manufacturing a substrate as described above, in which:

the substrate is brought into contact with a composition formed from organic assembling groups and from at least one precursor for the material constituting the mesoporous film;

the precursor precipitates around the organic assembling groups and its molecules grow; and then the organic assembling groups are removed, for example by calcining or extraction with acidified ethanol.

According to the invention, this process is characterized in that chemical molecules, such as hydrophobic/oleophobic molecules, are then brought into contact, in the form of a solution or a gas containing them, with the mesoporous film.

This process is remarkable in that it allows pores of approximately monodispersed size, of between 1.2 and 40 nm, to be easily obtained. This size can be adjusted by a suitable choice of the organic assembling groups, that is to say for example the greater or lesser length of the carbon chains constituting them. The durability of the hydrophobic/oleophobic function of the substrate, resulting from bringing the hydrophobic/oleophobic molecules into contact with the mesoporous film formed as indicated, is excellent.

Depending on the nature of the surface intended to be coated with the mesoporous film, it may be recommended, or even be necessary, to insert a primer layer so as to promote adhesion of the mesoporous film to its substrate and/or simply obtain a high enough quality of this adhesion. For this purpose, prior to the substrate being brought into contact with the composition containing the precursor for the mesoporous material, a layer having an isoelectric potential greater than or equal to the pH of the said composition is deposited on the substrate.

One particularly favourable method of implementing the process of the invention is one in which the organic assembling groups consist of micelles of cationic surfactant molecules, the precursor for the mesoporous material is a silicon alkoxide and they are in solution and, possibly, in hydrolysed form.

Particularly advantageously, the cationic surfactant is cetyltrimethylammonium bromide, the precursor for the mesoporous material is in solution in its form resulting from hydrolysis in acid medium, $Si(OH)_4$, and the surfactant/Si molar ratio is between $10^{-4}$ and 0.5. This combination constitutes a set of optimum conditions for obtaining the mesoporous film; it is assumed that this combination has a favourable influence on the micellar geometry, but this relies on complex energy modifications not completely understood at the present time.

However, one of the major advantages of the technique used to implement the invention is the possibility of varying the size of the pores of the mesoporous film within all the values indicated above by choosing the organic assembling groups judiciously. Thus, for these, anionic surfactants, nonionic surfactants, amphiphilic molecules, for example block copolymers, etc., may be used.

Another subject of the invention consists of glazing for buildings or transport vehicles, at least part of the transport surface of which consists of a substrate described above.

The example which follows will allow the invention to be more clearly understood.

EXAMPLE

A mesoporous silica film according to the invention was deposited on three specimens of silica-soda-lime float glass.

Each specimen was carefully cleaned by:

agitation in an ultrasonic bath for 30 minutes in a detergent solution;

rinsing with water agitation for 15 minutes with ultrasound in ultra pure water;

drying with nitrogen.

Once the substrate has been cleaned, an alumina precipitate layer was deposited on the surface of each specimen, the thickness of the layer, determined by atomic force microscopy, being about 5 nm.

The operating protocol was the following:

A $10^{-2}$M KOH solution was added to a solution containing 150 ml of $10^{-2}$M $KNO_3$ and 60 ml of $10^{-4}$M $Al(NO_3)_3$ so as to obtain a pH of 6.5. The glass substrates were then deposited in the stirred solution and left for 15 minutes. After the specimens were rinsed in a $10^{-2}$M $KNO_3$ solution and dried with nitrogen, they were put in an oven at 150° C. for one hour. Rinsing with water then allowed any KNO3 crystals on the substrate to be removed. (The isoelectric potential of alumina is 9 and is greater than the pH of the starting composition for forming the mesoporous film, deposited later.)

The process then continued with the actual formation of the mesoporous film, using a sol-gel technique.

A mixture of tetraethoxysilane (TEOS), water acidified by HCl to a pH of 2.5 and ethanol in respective molar proportions of 1/10/6 was stirred at room temperature for 18 hours. Next, the ethanol was partially evaporated under a vacuum of 1 mbar until half the initial volume of the solution had been evaporated. A colourless transparent solution, mainly composed of silicic acid ($Si(OH)_4$) and water, was obtained.

A cationic surfactant was then dissolved directly in the prehydrolysed TEOS solution thus obtained. The surfactant was cetyltrimethylammonium bromide (CTAB), introduced in an amount such that the molar ratio r=CTAB/Si was 0.1. Given its amphiphilic nature, the surfactant formed supramolecular structures or micelles.

Each specimen provided with its alumina layer serving as primer was cleaned, by exposing its surface to intense UV-C irradiation in a stream of oxygen, this having the effect of oxidising and removing the carbonaceous contaminants present.

Immediately after this cleaning operation, the sol containing the TEOS and the CTAB was deposited on each specimen by spin coating. In this technique, the specimen is rapidly rotated during deposition; this spin coating operation is characterized by an acceleration of 1500 rpm/s, a speed of 2500 rpm and a rotation time of 30 s.

Immediately after deposition, the films were heated for a few hours at 100° C.

The CTAB was then extracted from the film of each specimen by calcining in a tube furnace at 400° C. in air with a temperature rise of 10° C./h. The film thus formed on the three specimens was transparent and mesoporous, and its thickness, determined by atomic force microscopy by moving along the edge of the specimen, was about 1 $\mu$m. The porous lattice corresponded to the volume left vacant by the removal of the CTAB micelles, taking into account the contractions likely to have occurred during inter alia the heating/calcining operations. The mean pore diameter was about 3 nm.

The first specimen underwent a gas treatment, at reduced pressure and at room temperature, with $C_{10}F_{17}H_4SiCl_3$.

The hydrophobic nature of the specimen was then quantitatively evaluated by measuring the initial contact angle with water: this was 105°.

Next, the abrasion resistance of the hydrophobic/oleophobic property was then evaluated by measuring the contact angle with water after 100 revolutions of a Taber test (100 revolutions of a CS 10F grinding wheel with a force of 500 g applied). The result, 82°, corresponds to good abrasion resistance.

The second and third specimens were treated in two stages. Firstly, they were grafted in the gas phase at 60° C. with diethylchlorosilane. The Si—H groups of the grafted diethylchlorosilane molecules were then made to react by hydrosilylation, in the presence of Karsted catalysts, with divinyl-terminated polydimethylsiloxanes having number-average molar masses $\overline{M}_n$ of 2500 and 12500, respectively.

Moreover, each of the two divinyl-terminated polydimethylsiloxanes ($\overline{M}_n$=2500 and $\overline{M}_n$=12500) was grafted separately onto a specimen of bare silica-soda-lime float glass, that is to say one with no mesoporous coating. The grafting was carried out as indicated above.

The contact angle with water before and after 100 revolutions of the Taber test were again measured. The results are given in the table below.

TABLE

|  | Mesoporous layer | | Bare glass | |
| --- | --- | --- | --- | --- |
|  | Initial angle | Angle after 100 rev. of Taber test | Initial angle | Angle after 100 rev. of Taber test |
| $\overline{M_n}$ = 2500 | 95° | 71° | 97° | 45° |
| $\overline{M_n}$ = 12500 | 102° | 78° | 101° | 49° |

It is clear that the presence of the mesoporous layer helps to retain the hydrophobicity/oleophobicity of the property to a much greater degree under harsh abrasion conditions.

The invention therefore makes available a substrate whose transparency and optical quality allow it to be used in windows, such as the windscreen of a motor vehicle or an aircraft. In particular, the substrate can form the outer surface thereof, the excellent durability of its hydrophobic/oleophobic coating designing it particularly for this purpose, especially when the windscreen wipers, or other abrasive means, are used.

While various descriptions of the present invention are described above, it should be understood that the various features can be used singly or in any combination thereof. Therefore, this invention is not to be limited to only the specifically preferred embodiments depicted herein.

Further, it should be understood that variations and modifications within the spirit and scope of the invention may occur to those skilled in the art to which the invention pertains. Accordingly, all expedient modifications readily attainable by one versed in the art from the disclosure set forth herein that are within the scope and spirit of the present invention are to be included as further embodiments of the present invention. The scope of the present invention is accordingly defined as set forth in the appended claims.

What is claimed is:

1. A substrate coated with a mesoporous film, wherein chemical molecules are bonded to the mesoporous film, and wherein said chemical molecules are hydrophobic/oleophobic and are selected from the group consisting of:
   (a) silicones; and
   (b) compounds satisfying the formulae:

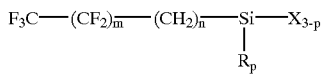

and $R_{p'}SiX_{4-p'}$;

wherein:
   m=0 to 15;
   n=1 to 5;
   p=0, 1, or 2;
   R is selected from the group consisting of a linear alkyl group, a branched alkyl group, and a hydrogen atom;
   X is a hydrolysable group; and
   p'=0, 1, 2, or 3.

2. The substrate of claim 1, wherein the substrate is made of a glass material or a plastic.
3. The substrate of claim 2, wherein the substrate is made of glass.
4. The substrate of claim 1, wherein the mesoporous film comprises at least one compound including at least one of the elements Si, W, Sb, Ti, Zr, Ta, V, Pb, Mg, Al, Mn, Co, Ni, Sn, Zn, In.
5. The substrate of claim 4, wherein the mesoporous film has a periodic lattice on the scale of domains at least about 20 nm in size.

6. The substrate of claim 4, wherein the mesoporous film comprises a substoichiometric and/or doped metal oxide to make the mesoporous film electrically conductive.
7. A glazing for buildings or transportation vehicles comprising a transparent surface, wherein at least a portion of the transparent surface comprises a mesoporous film and chemical molecules bonded thereto, and wherein said chemical molecules are hydrophobic/oleophobic and are selected from the group consisting of:
   (a) silicones; and
   (b) compounds satisfying the formulae:

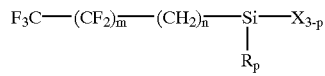

and $R_{p'}SiX_{4-p'}$;

wherein:
   m=0 to 15;
   n=1 to 5;
   p=0, 1, or 2;
   R is selected from the group consisting of a linear alkyl group, a branched alkyl group, and a hydrogen atom;
   X is a hydrolysable group; and
   p'=0, 1, 2, or 3.

8. A substrate comprising:
   a coating surface; and
   a mesoporous film having hydrophobic/oleophobic molecules bonded thereto,
   wherein the mesoporous film is disposed on said coating surface and said molecules comprise at least one of:
   a) silicones; and
   b) compounds satisfying the formulae

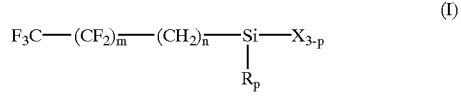

and $R_{p'}SiX_{4-p'}$;   (II)

wherein:
   m=0 to 15;
   n=1 to 5;
   p=0, 1 or 2;
   R is selected from the group consisting of a linear alkyl group, a branched alkyl group, and a hydrogen atom; X is a hydrolysable group; and
   p'=0, 1, 2 or 3.

9. The substrate of claim 8, wherein said mesoporous film has pores sized between about 1.2 nm and about 40 nm.
10. The substrate of claim 8, wherein said mesoporous film has pores sized between about 1.2 nm and about 20 nm.
11. The substrate of claim 8, wherein said mesoporous film comprises a periodic lattice including domains of at least 20 nm.
12. The substrate of claim 8, wherein said mesoporous film comprises at least one compound including at least one of Si, W, Sb, Ti, Zr, Ta, V, Pb, Mg, Al, Mn, Co, Ni, Sn, Zn, and In.
13. The substrate of claim 8, wherein said coating surface comprises at least one of glass, ceramic, glass-ceramic, or polymer.
14. The substrate of claim 8, further comprising an anti-reflection layer.

15. The substrate of claim 8, further comprising a reflecting layer.

16. The substrate of claim 8, further comprising an electrically conducting layer.

17. The substrate of claim 8, wherein the mesoporous film comprises a zinc oxide.

18. The substrate of claim 17, wherein the zinc oxide is doped with an element selected from the group consisting of indium, fluorine, aluminum, and tin.

19. The substrate of claim 8, wherein the mesoporous film comprises an indium oxide.

20. The substrate of claim 8, wherein the mesoporous film comprises a tin oxide.

21. The substrate of claim 8, wherein the mesoporous film has a thickness between 10 nm and 10 $\mu$m.

22. The substrate of claim 8, wherein the mesoporous film has a thickness between 0.05 $\mu$m and 5 $\mu$m.

23. The substrate of claim 8, wherein the molecules comprise octadecyltrichlorosilane.

24. The substrate of claim 8, wherein the molecules comprise polydialkylsiloxane.

25. The substrate of claim 8, wherein the coating surface is formed on glass and the mesoporous film comprises $TiO_2$.

* * * * *